United States Patent [19]

Brandoli

[11] 4,234,173
[45] Nov. 18, 1980

[54] STRUCTURE FOR A MOTOR VEHICLE SEAT

[76] Inventor: Luigi Brandoli, Via Vincenzo Vela 32, I-10.128 Turin, Italy

[21] Appl. No.: 942,352

[22] Filed: Sep. 14, 1978

[51] Int. Cl.³ .............................................. A47C 7/28
[52] U.S. Cl. ...................................... 267/103; 5/404; 267/110; 297/218
[58] Field of Search .............. 267/103, 104, 106, 107, 267/109, 110, 131; 297/218, 352, 358; 5/353.1, 353.2, 353.3, 403, 404, 405

[56] References Cited

U.S. PATENT DOCUMENTS

| 2,609,036 | 9/1952 | Stubnitz | 5/353.1 |
| 2,849,057 | 8/1958 | Neely | 267/107 |
| 3,156,461 | 11/1964 | Caughey | 267/110 |
| 3,275,357 | 9/1966 | Tabor | 267/110 |
| 4,079,994 | 3/1978 | Kehl | 297/218 |

FOREIGN PATENT DOCUMENTS

| 1285139 | 12/1968 | Fed. Rep. of Germany | 5/353.1 |
| 619430 | 3/1949 | United Kingdom | 267/107 |

*Primary Examiner*—Edward R. Kazenske
*Attorney, Agent, or Firm*—Young & Thompson

[57] ABSTRACT

A structure for a motor vehicle seat, particularly a rear fixed or overturnable seat, comprises a perimetrical frame made of a ring-like closed metal tube and a plurality of springing elements disposed between the front and rear portions of the perimetrical frame, and each springing element has a cross member situated below the plane of the perimetrical frame for providing anchorage points to which the upholstery of the seat may be fixed without requiring the use of auxiliary members.

1 Claim, 5 Drawing Figures

STRUCTURE FOR A MOTOR VEHICLE SEAT

BACKGROUND OF THE INVENTION

The present invention relates to a metal structure for a motor vehicle seat, in particular, a motorcar seat.

The known seats for motor vehicles comprise, as their basic element, a perimetrical frame made of stamped plate or formed by welding together a plurality of wire rods. This frame is stiffened, particularly in respect of torsional stresses, by means of cross-members, to which the seat springs are anchored; moreover, special listels made of plate material have to be applied onto the frame, which are provided with nails for the anchorage of the upholstery or with elongated holes for fixing thereon the upholstery by means of wire stitches. The application of the stiffening cross-members and the listels for anchoring the upholstery entails a series of relatively expensive operations, and besides this, the listels, especially those provided with nails, hinder the operations carried out on the frame and may constitute a danger for the workers. But the most serious disadvantage of the known structures derives from the very high cost of the specific equipment required for each type of frame to be produced, which equipment consists of dies, in the case of stamped plate frames, and of means for supporting the wire rod sections in the correct position, in the case of frames made of welded wire rods. Only a relatively modest part of the production equipment can be utilized or adapted for all the various types of frames which have to be produced.

BRIEF SUMMARY OF THE INVENTION

The aim of the present invention is to provide an efficient contribution to the economy of the production of the motor vehicles seat structures, especially in the case of many different types of seat structures having to be produced for various types of vehicles, by advantageously modifying the structure of the known seats and the respective process of production.

According to the concept of the present invention, a structure for a motor vehicle seat is realized by bending one or more metal tube members and connecting them to form a closed perimetrical frame having the required shape, then anchoring onto the said perimetrical frame springing elements having at least a first section turned downwards and arranged to provide anchorage points for fixing the upholstery, and by applying shaped wire rod segments in those areas which are not sufficiently attended to for this purpose by the springing elements, which shaped wire rods are also anchored to the perimetrical frame made of tubes or are fixed to the springing elements by means of hooks.

In this way, the perimetrical frame is manufactured essentially by means of a tube bending machine, and therefore the passage from the production of one type of frame to another requires only a modification or substitution, with modest expenses, of the equipment of the tube bending machine; the perimetrical metal tube frame, the weight being equal, results in being much more stiff, especially against torsional stresses, as compared with a frame made of stamped plate or of welded wire rods, and therefore does not require the use of any stiffening cross-members; also, the initial sections of the springing elements, integrated, if necessary, by the shaped wire rod segments, provide anchorage points which can be used very advantageously for fixing the upholstery, without requiring the use of special auxiliary listels.

The seat structure provided by the present invention is particularly suitable for manufacturing rear motorcar seats and can be utilized both for fixed and for overturnable seats.

BRIEF DESCRIPTION OF THE DRAWING

The invention will be better understood through the following description of an embodiment given by way of non-limiting example and diagrammatically shown in the annexed drawing, in which.

DETAILED DESCRIPTION OF THE PREFERRED EMBODIMENT

Figure 3:
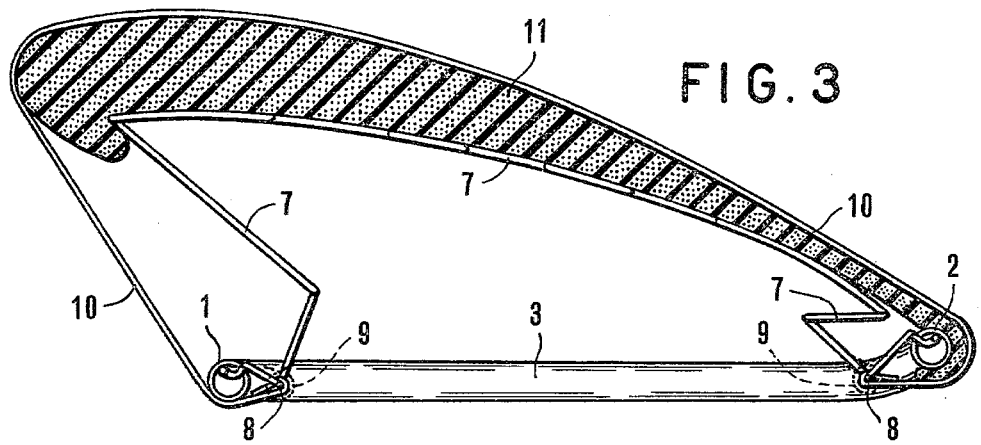
FIG. 3 is a sectional view substantially along line III—III of FIG. 2, showing the seat structure completed with the application thereon of the pad and the cover or upholstery.
Figure 2:
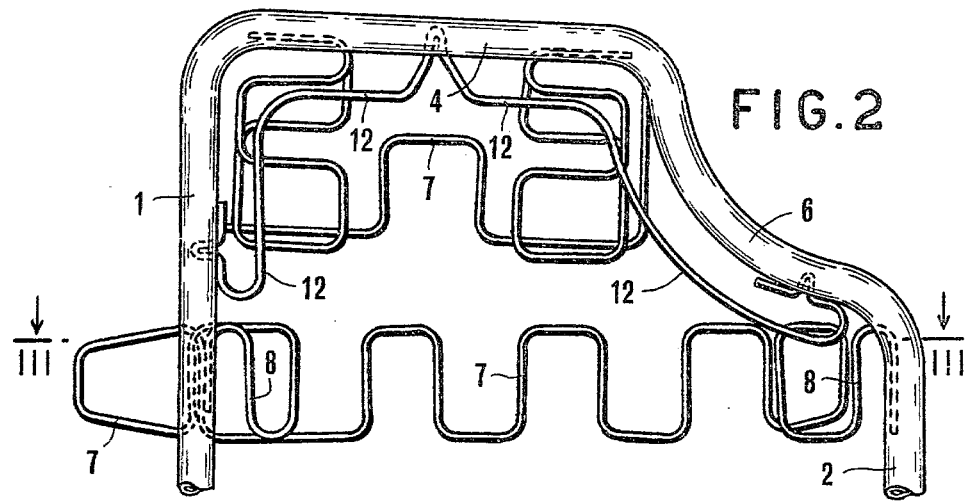
FIG. 2 is an enlarged representation of an end segment of the perimetrical frame, as seen from the bottom and provided with springing elements and shaped wire rod segments.

The embodiment shown in the drawing relates to the structure of a rear motorcar seat intended to be located partly between the spaces for the rear wheels, and consequently comprises a front side 1, a rear side 2, two flanks 3 and 4 and two arcuate unions 5 and 6. According to the invention, all these parts are formed by bending a metal tube which, in this case, is circular in cross section. The perimetrical frame 1-6 may be made of a single tube section, closed on itself at any of points A, B, C, D in FIG. 1, for example, or it may be made of two or more sections connected to each other at two or more of the said points. The connection may be carried out for example by electric welding, spot welding, rolling or other methods. The perimetrical frame is formed completely on a tube bending machine and therfore it is sufficient to modify the equipment of the machine for obtaining perimetrical frames of different shapes, proportions and dimensions, as may be suitable for the various requirements, without having to incur great ependiture for the equipment. Moreover, as the tube has a high resistance to twisting, it is not necessary to apply stiffening cross-members to the perimetrical frame, as is the case usually.

Denticular springs, like the one shown at 7, are hooked between the front side 1 and the rear side 2 of the perimetrical frame, which springs have the particular feature that their first section, beginning from both ends, is turned downwards and consequently has a cross-member 8 situated below the upper limit plane of the perimetrical frame, i.e. in a position which is easily accessible from the underside. The assembly of cross-members 8 of the various springs 7 of the sprung seat structure provides convenient anchorage points for fixing, by means of hooks 9, the edges of a covering 10 stretched on a padded cushion 11 disposed on the surface defined by the upper portions of the springs 7. In a position corresponding to the flanks 3, 4 and the arcuate unions 5, 6, where the springing system has particular zones which may not be suitable for providing anchorage points, these latter are provided by a shaped wire rod 12 anchored onto corresponding sections of the perimetrical frame made of tubes. Preferably, the anchorages of the shaped wire rod 12 to the tube are achieved in the same way as those of the springing elements 7, so that the necessary seatings in the tube can be made by means of the same equipment, and in the same operation, as the seatings for the anchorage of the springs. It is obvious, however, that the shaped wire rod 12 could also be connected to the perimetrical frame in a different manner from that of the springs 7, or not be connected at all to the said frame and, instead, be anchored by means of hooks to some of the springing elements 7. Finally, there will be no shaped wire rod 12 at all in the case in which the anchorage points 8 provided by springs 7 are sufficient by themselves for the application and the fixing of the upholstery.

Figure 1:
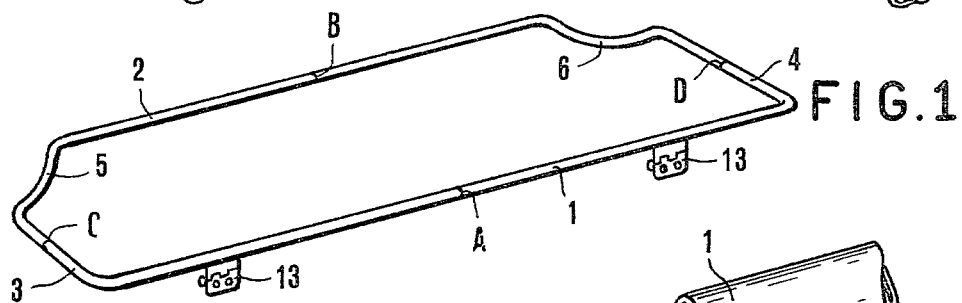
FIG. 1 is a perspective view of the perimetrical frame of a seat structure according to the present invention.
Figure 4:
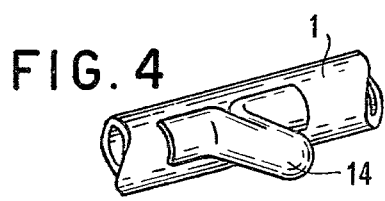
FIG. 4 shows a fastener for fixing the structure to the floor of the vehicle, in the case of a fixed seat.
Figure 5:
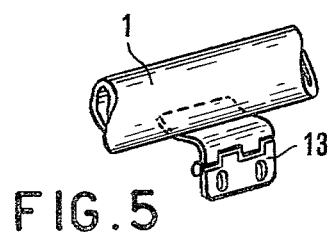
FIG. 5 shows a means for connecting the structure to the floor of the vehicle, in the case of an overturnable seat.

The perimetrical frame shown in FIG. 1 is to be used for overturnable seats and therefore, fixed to it by welding or by other means are hinges 13, one of which is shown, enlarged, in FIG. 5. Conversely, in the case of application of the perimetrical frame to a fixed seat, centering and anchoring pins 14 will be applied on the perimetrical frame, one of these pins 14 being shown in FIG. 4 (turned by 90°, for the sake of clarity, with respect to the real position relative to a frame positioned as shown in FIG. 1). Thus, the structure according to the invention can be manufactured, with minimum constructional modifications, both for fixed and overturnable seats.

As can be appreciated, the application of the concepts of the present invention allows a more convenient industrial manufacture of a motor vehicle seat structure having advantageous characteristics, but above all it reveals its advantages in the manufacture of more types of seats, for which the components and industrial processes can be largely standarized, while greatly reducing the costs of the equipment specifically required for each type of seat.

Having thus described my invention, what I claim is:

1. A structure for a motor vehicle seat, comprising a perimetrical frame made of a metal tube, a plurality of springing elements disposed between and secured at their ends to opposite portions of said perimetrical frame, each said springing element having near but spaced from each end a cross member situated at a level below the upper limit plane of the perimetrical frame, and wire rods fixed to said perimetrical frame and situated substantially at the same level as said cross members, said cross members of the springing elements and said wire rods providing a complete set of anchorage points for the upholstery of the seat substantially entirely about said frame, said frame having relatively long front and rear sides and relatively short ends, said springing elements extending between said front and rear sides comprising said opposite portions, said wire rods being disposed only adjacent said ends, said wire rods each being secured to said frame at a plurality of points spaced about the frame only adjacent the ends of the frame, said wire rods extending adjacent but spaced from and in general parallelism with said ends of said frame between said spaced points of securement of said wire rods, each said wire rod being only secured to said frame adjacent the ends of the wire rod and at a point intermediate the ends of the wire rods, the points of securement of each wire rod to the frame being on portions of the frame that are out of parallelism to each other, said wire rod being bent double to form said intermediate point of securement.

* * * * *